United States Patent Office 2,923,709
Patented Feb. 2, 1960

2,923,709

17-SUBSTITUTED DERIVATIVES OF 1,11-EPOXY-4-METHYL-1,3,5(10),9(11)-ESTRATETRAENE

Frank B. Colton, Chicago, Ill., assignor to G. D. Searle & Co., Chicago, Ill., a corporation of Delaware No Drawing. Application March 2, 1959
Serial No. 796,265

10 Claims. (Cl. 260—239.55)

The present invention relates to a new group of 1,11-epoxy-4-methyl-1,3,5(10),9(11)-estratetraene derivatives substituted in the 17-position and more particularly to the compounds corresponding to the structural formula

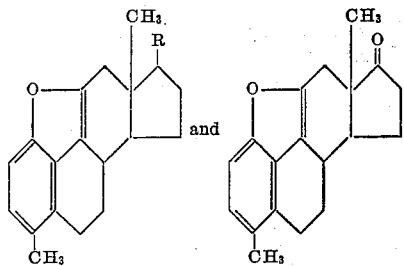

wherein R is a member of the class consisting of OH, —O—CO-(lower alkyl), —CO—CH$_3$, —CO—CH$_2$OH and —CO—CH$_2$O—CO-(lower alkyl).

The lower alkyl groups refer to methyl, ethyl, straight-chain and branched propyl, butyl, amyl, and hexyl groups. These compounds are active progestational, analgesic and local anesthetic agents.

The 1,11-epoxy-4-methyl-1,3,5(10),9(11)-estratetraenes of this invention can be conveniently prepared by mixing the corresponding 1,4-androstadiene-3,11-diones with a hydrohalic acid, typically hydrochloric or hydrobromic acid. Concentrated acids or somewhat diluted acids are suitable. The reaction is preferably carried out by heating to a range of about 50–70° C., but it can also be conducted at room temperature if more time is allowed for completion.

The compounds of the foregoing structure in which R is a hydroxy group are conveniently prepared by reducing the corresponding 17-ketone with an alkali metal borohydride or alkali metal aluminum hydride. The ester derivatives are most conveniently prepared by esterification of the free alcohol because the acid treatment used in the process of forming the epoxide causes de-esterification.

The invention is disclosed in further detail in the following examples which are used for illustration only and are not to be construed as limiting in spirit or in scope. Quantities are indicated in parts by weight.

Example 1

Under a nitrogen atmosphere a mixture of 2 parts of 1,4-androstadiene-3,11,17-trione and 10 parts of 48% hydrobromic acid is heated at 70° C. for 48 hours. During this time a precipitate forms which is collected on a filter and washed first with a small amount of concentrated hydrobromic acid and then with water. On recrystallization from acetone and water there is obtained 1,11-epoxy-4-methyl-1,3,5(10),9(11)-estratetraen-17-one which melts at about 159–160° C. The ultraviolet absorption spectrum shows maxima at 258, 280, and 291 millimicrons with molecular extinction coefficients of 11,000, 2,000 and 1,600. A minimum is observed at about 236 millimicrons. Infrared maxima are observed at 5.79, 6.08, 6.27 and 6.84 microns. The specific rotation of an 0.5% chloroform solution is +284°. The compound has the structural formula

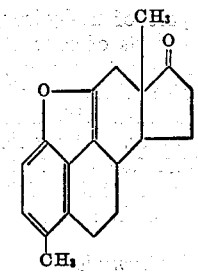

Example 2

To a solution of 2.16 parts of 1,11-epoxy-4-methyl-1,3,5(10),9(11)-estratetraen-17-one in 120 parts of ethanol are added 2 parts of sodium borohydride in 40 parts of ethanol and 50 parts of water. The mixture is maintained at room temperature for 40 minutes and then diluted with water. The resulting precipitate is collected on a filter, washed with water and crystallized from aqueous methanol to yield 1,11-epoxy-4-methyl-1,3,5(10),9(11)-estratetraen-17β-ol. The crude product melts at about 83–90° C.

Example 3

A mixture of 2 parts of 1,11-epoxy-4-methyl-1,3,5(10),9(11)-estratetraen-17β-ol, 17 parts of acetic anhydride and 10 parts of pyridine is maintained at room temperature for 7 hours and then treated with ice. The resulting precipitate is collected on a filter, washed with water and recrystallized from aqueous methanol and then from a mixture of acetone and petroleum ether to yield 1,11-epoxy-4-methyl-17β-acetoxy-1,3,5(10),9(11)-estratetraene. Ultraviolet maxima are observed at 258, 281, and 292 millimicrons, with molecular absorption coefficients of 11,600, 2,200 and 1,600 respectively. Infrared maxima are observed at about 3.41, 5.78, 6.01, 6.79, 6.91, 6.99, 7.21, 7.28, 7.38, 7.50, 7.60, 7.68, 7.91, 8.01, 8.16, 8.40, 8.70, 8.83, 8.95, 9.18, 9.58, 9.81, 10.02, 10.92, 11.23, and 12.31 microns.

Substitution of equal parts of propionic anhydride for the acetic anhydride used in the foregoing procedure yields 1,11-epoxy-4-methyl-17β-propionyoxy-1,3,5(10),9,(11)-estratetraene. The compound has the structural formula

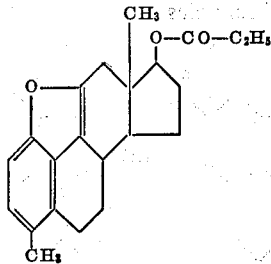

Example 4

A mixture of 5 parts of 1,4-pregnadiene-3,11,20-trione and 50 parts of concentrated hydrochloric acid is maintained at 60° C. for two days. The resulting precipitate is collected on a filter, washed with concentrated hydrochloric acid and then with water to yield 1,11-epoxy-4-methyl-17β-acetyl-1,3,5(10),9(11)-estratetraene. After crystallization from methanol it melts at about 181–183° C. Additional yield is obtained by maintaining the hydrochloric acid mother liquors at 60° C. for an additional day and dilution with water. The ultraviolet absorption spectrum shows maxima at 258.5, 280 and 292 millimicrons with molecular extinction coefficients of 11,200, 2,100 and 1,600 respectively and a minimum at about 237 millimicrons. Infrared bands are observed at 5.89, 6.01, 6.23, 6.81, 6.95, 7.21, 7.38, 7.56, 7.61, 8.05, 8.18, 8.29, 8.45, 8.65, 9.20, 10.03, 11.20 and 12.45 microns.

*Example 5*

A mixture of 1 part of 21-hydroxy-1,4-pregnadiene-3,11,20-trione and 10 parts of concentrated hydrochloric acid is maintained at 50° C. for three days. The precipitate is collected on a filter, washed with concentrated hydrochloric acid and then with water and crystallized from methanol and water. Ultraviolet maxima are observed at about 258.5, 280 and 292 millimicrons with extinction coefficients of 11,500, 2,000 and 1,600 respectively. Infrared maxima are observed at 2.8, 5.9 and 6.0 microns.

*Example 6*

A mixture of 1 part of 1,11-epoxy-4-methyl-17β-(β-hydroxyacetyl)-1,3,5(10),9(11)-estratetraene with 5 parts of acetic anhydride and 5 parts of pyridine is maintained at room temperature for 2 hours and then poured into ice water. The resulting precipitate is collected on a filter and washed with water. There is thus obtained 1,11-epoxy-4-methyl-17β-(β - acetoxyacetyl) - 1,3,5(10), 9(11)-estratetraene. The ultraviolet absorption spectrum shows a minimum at about 236 millimicrons and maxima at 258, 281 and 292 millimicrons with molecular extinction coefficients of 11,300, 2,100 and 1,500 respectively.

Substitution of 5 parts of propionic anhydride for the acetic anhydride in the foregoing example yields 1,11-epoxy-4-methyl - 17β - (β - propionoxyacetyl) - 1,3,5(10), 9(11)-estratetraene which has essentially the same ultraviolet absorption spectrum as the foregoing acetate. The compound has the structural formula

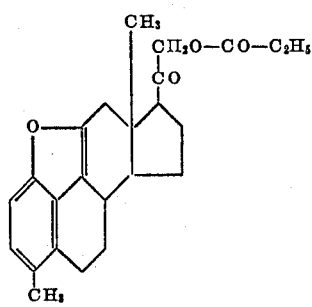

What is claimed is:

1. A member of the class consisting of the compounds of the structural formulas

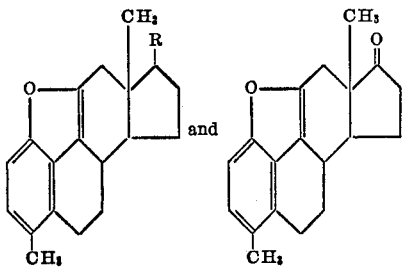

wherein R is a member of the class consisting of OH, —O—CO-(lower alkyl), —CO—CH$_3$, —CO—CH$_2$OH and —CO—CH$_2$O—CO-(lower alkyl).

2. 1,11 - epoxy - 4 - methyl - 1,3,5(10),9(11) - estratetraen - 17 - one.

3. 1,11 - epoxy - 4 - methyl - 1,3,5(10),9(11) - estratetraen - 17β - ol.

4. A lower alkanoic acid ester of 1,11-epoxy-4-methyl-1,3,5(10),9(11)-estratetraen-17β-ol.

5. 1,11 - epoxy - 4 - methyl - 17β - acetoxy - 1,3,5(10), 9(11) - estratetraene.

6. 1,11 - epoxy - 4 - methyl - 17β - acetyl - 1,3,5(10), 9(11) - estratetraene.

7. 1,11 - epoxy - 4 - methyl - 17β - (β - hydroxyacetyl) - 1,3,5(10),9(11) - estratetraene.

8. A lower alkanoic acid ester of 1,11 - epoxy - 4-methyl - 17β - (β - hydroxyacetyl) - 1,3,5(10),9(11)-estratetraene.

9. The process for preparing 1,11-epoxy-4-methyl-1,3,5(10),9(11)-estratetraen - 17 - one which comprises heating 1,4-androstadiene-3,11,17-trione with hydrohalic acid.

10. The process for preparing a compound of the structural formula

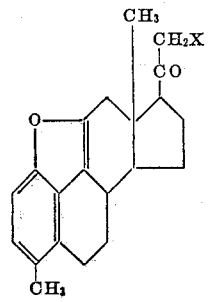

wherein X is a member of the class consisting of hydrogen and hydroxy which comprises heating a compound of the structural formula

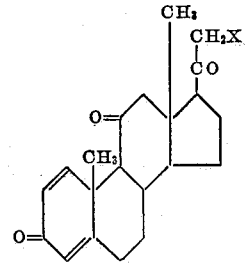

wherein X is defined as above, with hydrohalic acid.

References Cited in the file of this patent

UNITED STATES PATENTS

| | | |
|---|---|---|
| 2,823,171 | Fried et al | Feb. 11, 1958 |
| 2,862,926 | Thomas et al. | Dec. 2, 1958 |
| 2,880,217 | Thoma et al. | Mar. 31, 1959 |

OTHER REFERENCES

Tamm et al.: Experientia, vol. 13, pages 185–7 (1957).

UNITED STATES PATENT OFFICE
CERTIFICATE OF CORRECTION

Patent No. 2,923,709                                           February 2, 1960

Frank B. Colton

It is hereby certified that error appears in the printed specification of the above numbered patent requiring correction and that the said Letters Patent should read as corrected below.

Column 3, line 20, Example 6, after "-estratetraene" insert -- thus obtained --.

Signed and sealed this 9th day of August 1960.

(SEAL)
Attest:

KARL H. AXLINE                                          ROBERT C. WATSON
Attesting Officer                                       Commissioner of Patents